United States Patent [19]
Helfand

[11] Patent Number: 6,148,073
[45] Date of Patent: Nov. 14, 2000

[54] NETWORK CENTRIC CALL PROCESSING ARCHITECTURE USING DISTRIBUTED CALL SEGMENTS

[75] Inventor: Thomas Helfand, Richardson, Tex.

[73] Assignee: Northern Telecom Limited, Montreal, Canada

[21] Appl. No.: 08/992,169

[22] Filed: Dec. 17, 1997

[51] Int. Cl.[7] .................................................. H04M 7/00
[52] U.S. Cl. ........................ 379/221; 370/217; 370/225; 370/228; 379/224; 379/229; 379/240
[58] Field of Search ................................. 379/221, 220, 379/219, 224, 229, 230, 242, 240; 370/216, 217, 218, 219, 220, 225, 226, 227, 228

[56] References Cited

U.S. PATENT DOCUMENTS

| | | | |
|---|---|---|---|
| 4,284,852 | 8/1981 | Szybicki et al. ......................... | 379/221 |
| 4,956,835 | 9/1990 | Grover .................................... | 370/228 |
| 5,058,105 | 10/1991 | Mansour et al. ......................... | 379/221 |
| 5,146,452 | 9/1992 | Pekarske ................................. | 379/221 |
| 5,377,262 | 12/1994 | Bales et al. .............................. | 379/221 |
| 5,390,242 | 2/1995 | Bales et al. .............................. | 379/221 |
| 5,463,615 | 10/1995 | Steinhorn ................................ | 379/221 |
| 5,548,639 | 8/1996 | Ogura et al. ............................. | 379/221 |
| 5,642,396 | 6/1997 | Cowgill ................................... | 379/230 |
| 5,646,936 | 7/1997 | Shah et al. .............................. | 370/228 |
| 5,734,811 | 3/1998 | Croslin .................................... | 714/4 |
| 5,844,981 | 12/1998 | Pitchford et al. ....................... | 379/221 |
| 5,881,048 | 3/1999 | Croslin .................................... | 379/221 |

*Primary Examiner*—Harry S. Hong
*Attorney, Agent, or Firm*—Haynes and Boone, LLP

[57] ABSTRACT

An apparatus and method for allocating a data path during a call by establishing a first network call segment associated with an agent and sending a message with routing information across a tandem link using predetermined signaling paths. A second embodiment of the invention comprises a method of allocating a data path during a call wherein the datapath is also a voice path. A third embodiment of the present invention additionally includes apparatus and method for allocating a data path during a call including establishing a two-way connection.

16 Claims, 3 Drawing Sheets

NETWORK CENTRIC CALL PROCESSING ARCHITECTURE USING DISTRIBUTED CALL SEGMENTS

BACKGROUND OF THE INVENTION

1. Field of the Invention

The present invention relates to telephony call processing in general and distributed call processing in particular.

2. Description of the Related Art

Switching allows the telephony service provider the ability to connect subscribers to each other, thus eliminating the need for direct connections between users. In the simplest scenario all subscribers have access to a single switch. Originations are processed by the switch and terminated to the desired subscriber if available. Because no single switch can provide service to all subscribers, switches are geographically distributed and interconnected to form a network. A subscriber origination can be processed at the local switch and then forwarded to another switch on the network serving the terminating subscriber.

In the case of long distance networks and international calls, there can be further intermediate switches (known as tandem switches) if the originating and terminating switches do not have direct connectivity.

Figure 1:
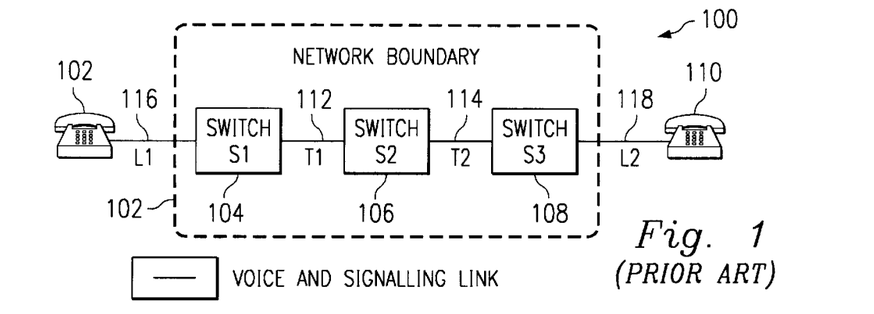
FIG. 1 illustrates a prior art switched network.

FIG. 1 illustrates a sample call architecture of a switching network. Switching network 100 includes a calling party 102 who intends to place a call to called party 110. Calling party 102 places a call over L1 116 which is a network access point. Switch S1 104 receives the dialed digits from calling subscriber 102 and connects the call over T1 112 intermachine trunk to switch S2 106, which in turn switches the call over T2 114 intermachine trunk to switch S3 108. Switch S3 108 then in turn connects the call to called party 110 over L2 118 link egress point.

Originating services are processed at the access point and terminating services at the egress point. Although every switch processes the call, there is no added value processing at the tandem switch. It is used to route the call further and provide a voice path throughout the network.

Within a switch, modern call processing generally uses call segments (or call halves) in a simple two way call to divide the work. Each agent is processed by its own call segment. Call segments simplify the implementation of complex services involving more than two agents by encapsulating the processing required for an agent including protocol and services. Call events are passed between connected call segments as necessary. Some architectures place the call segments on the switch itself, while others such as AIN (Advanced Intelligent Network) distribute the intelligence across hardware platforms. When call segments reside on separate platforms they must communicate with each other via a LAN (Local Area Network) or some other form of network communication. Intelligent Networking (IN) uses connection oriented TCAP/INAP messaging (Transaction Capabilities Application Part/Intelligent Network Access Point).

Figure 2:
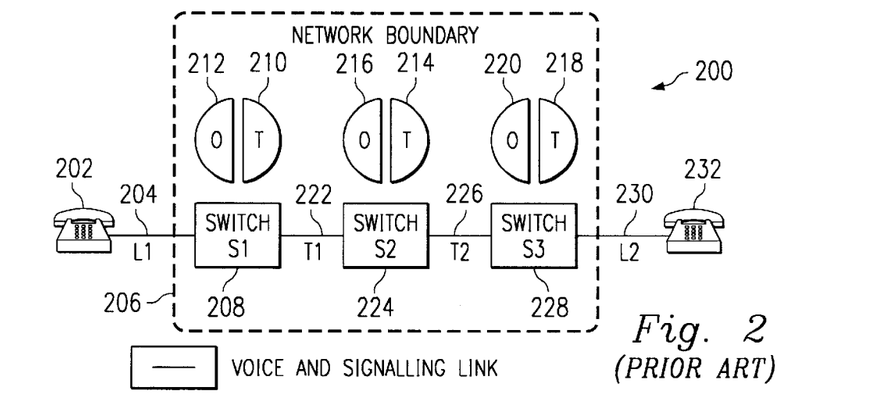
FIG. 2 illustrates another prior art switched network viewpoint.

Referring now to FIG. 2, Network 200 illustrates another aspect of current call processing. Originating call processing segments 212, 216, and 220 correspond to switches 208, 224, and 228 respectively. As in FIG. 1 the switches are interconnected by intermachine trunks T1, T2 222, 226. Terminating call processing is performed in 210, 214, 218 which also correspond to switch S1, switch S2 and switch S3 208, 224, 228.

The call segments can either be distributed or local to the switch. Regardless of the implementation of the segments, they are associated with the switch and corresponding agent. At switch S1 208, O 212 performs processing for L1 204, and T 210 performs processing for T1 222. At switch S2 224, T1 222 becomes an origination and terminates to T2 226 by way of terminating call processor 214. At switch S3 228, T2 226 becomes an origination point which terminates off network by T2 218 to link egress point L2 230 before eventual connection to called party 232.

A drawback to the above identified network call segment processing scheme include requiring a single call to be processed at every switch it enters. Further, there is no added value in the tandem processing.

In FIG. 2 every call half associated with an intermachine trunk is merely forwarding the initial origination at the network access point. Additionally, originating service information needed at the network egress point must be encoded into the intermachine protocol. This adds unnecessary complexity to services.

There is accordingly a need for a new method and apparatus in order to solve or ameliorate one or more of the above described problems.

SUMMARY OF THE INVENTION

The method and apparatus of the present invention is accomplished by a means for and a method of allocating a data path during a call setup comprising the steps of establishing a first network call segment associated with an agent and sending a message with routing information across a tandem link using predetermined signaling paths.

A second embodiment of the present invention further includes a method for allocating a data path during a call setup wherein the data path is also a voice path.

A third embodiment of the present invention additionally includes means and method for allocating a data path during a call setup including establishing a two way connection.

Further features of the above-described invention will become apparent from the detailed description hereinafter.

The foregoing features together with certain other features described hereinafter enable the overall system to have properties differing not just by a matter of degree from any related art, but offering an order of magnitude more efficient use of processing time and resources.

Additional features and advantages of the invention will be set forth in part in the description which follows, and in part will be apparent from the description, or may be learned by practice of the invention. The advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate preferred embodiments of the apparatus and method according to the invention and, together with the description, serve to explain the principles of the invention.

DETAILED DESCRIPTION

In general, a call can have many meanings in a switching environment. From the subscriber's viewpoint it is a connection to the remote subscriber, regardless of diverse networks. At the network level, a call is a complete connection between two agents on a network. From a single switch perspective a call is a connection between two agents on the switch as well as the logic required to establish that connection.

When discussing network centric processing it is important to distinguish between various perspectives of the call. The network call processing architecture of the present invention relies on the underlying switch architecture based upon some form of call segments. Call segment completely encapsulates all processing for a particular agent. This includes but is not limited to the signaling protocol translations and routing in any service processing. Each call segment has at least one connected call segment which encapsulates the other agents involved in the call. A traditional station to station call will contain an originating and associated terminating call segment. Complex calls involving multiple agents will contain more than just two call segments. There is a one to one relationship between call segments and agents.

Call processing is by nature event driven. Signaling events enter a switch through the private protocol interface and are converted by the call segment generic call events which are processed by and passed between associated call segments. The interface between call segments is therefore independent of the protocol associated with the agents.

Although call segments model a voice agent, voice connections between agents are modeled separately as components must have knowledge of both parties. The central entity to the connection model is a pipe.

Every two connected call segments has a single pipe. A pipe can accept two voice agents in routing PCM data in both directions from either end. An agent can be connected through more than a single pipe. Complex calls involving connections between multiple agents can be modeled as a set of pipes—one for every two connected agents.

Figure 3:
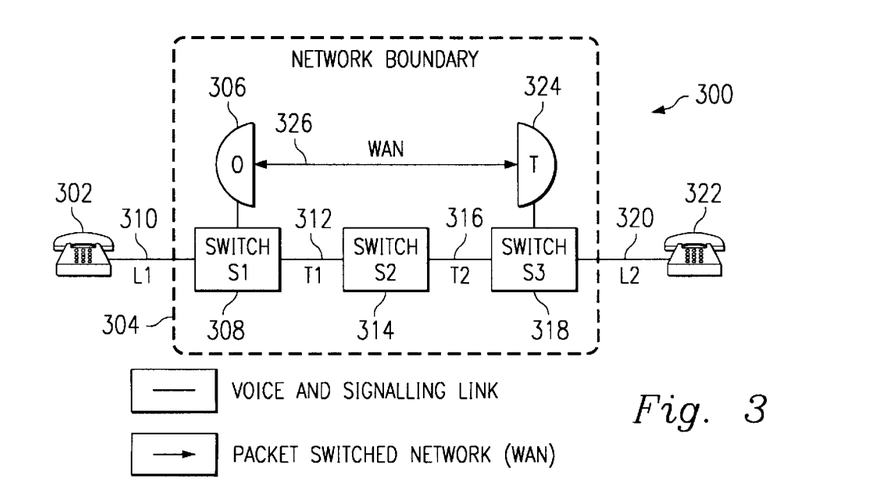
FIG. 3 illustrates a network call segment processing apparatus of the present invention.

Referring now to FIG. 3, a distributed network call segment of the present invention is illustrated. Calling party 302 accesses switch S1 308 through link access point 310. An originating call process segment 306 is associated with switch S1 308. Switch S1 308 is operably connected through trunk 312 to switch S2 314 which in turn is connected through trunk T2 316 to switch S3 318. The connection is completed through link egress point 320 to called party 322. Switch S3 318 is also connected to terminating segment processor T324.

Originating segment 306 is connected to switch S1 308 at the entry point to the network. The connection is likewise is completed through wide area network (WAN) 326 to terminating call segment 324. WAN 326 eliminates intervening origination and terminating call segments at each of the switches.

A telephony network can be viewed as a large switch which connects a network originator and a network terminator through cooperating intermediary switches. A call is a logical connection between those two points and includes a set of voice path connections within the intermediary switches. Call processing is only necessary at the access and egress points to the network in the present invention. By connecting the call segments associated with the network originator and terminator via a WAN, they can communicate directly, thus eliminating the need for tandem processing.

Directly communicating call segments associated with agents on different switches are termed network call segments. This is an improvement over traditional switch oriented call segments, as described previously, in which communication between call segments is limited to those processing agents on the same switch. By the instant invention, expensive voice path connections need not be established to the intermediary trunk links that service processing. This results in reduced CPU load and lower post dial delay.

A direct implication of the architecture of the present invention is that the originating switch is capable of uniquely identifying a terminating switch on the network. For some call types such as SAC 800 (Service Access Code) or LNP (Local Number Portability) this may be via a global translation data base.

The voice path connection links to the intermediary trunks are established even though the complete voice connection may be enabled and broken at the network access and egress points. Tandem connections are therefore established and enable voice path connection immediately. This is done by sending a message with routing information across the tandem link using existing signaling and immediately constructing a two way PCM connection. Either a new message must be implemented whose presence informs the switch to connect, or a new parameter is added to an existing origination message for that purpose. When the last switch receives the voice path message, the established voice path must be associated with the terminating call half. A unique call ID will be generated at the originating call half and passed to the terminating call half as well as propagated with the voice path messages to enable this association. When the call is released a voice path release message must be propagated across the intermediary trunks. Alternate schemes for establishing voice path may be readily evident to those skilled in the art.

Network call segments are conceptually similar to, but should not be confused with, out of band signaling protocols such as ISUP (Integrated Services Digital Network User Part). An out of band protocol delivers the protocol messages separately from the associated voice agent across a separate network in the case of Signaling System Number 7 (SSN7). However, the messages are always associated with a particular voice channel. Network call segments distribute the processing of the call on the network solely to the relevant switches and separate the path through the network. The voice path connection between the network call segments can span many switches and agents.

Network Call Segments

A call segment provides processing for a single agent on a switch. Directly communicating call segments associated with agents on different switches are termed network call segments. Network call segments are able to pass service data directly, instead of encoding the information in an intermediary trunk (IMT) signaling protocol.

The originating agent must be able to uniquely identify a terminating agent on the network while at the originating switch. Switch oriented architectures allow partial routing of a call origination in which the call is forwarded to a tandem switch without knowledge of its final destination. Routing is be deterministic in a network oriented architecture so that the network call segments can locate each other.

It is beneficial to divide traditional routing into three distinct functions, translations, network routing and local routing. Translations are responsible for determining all possible destinations on the network. Network routing selects the best available destination.

In a simple call scenario these functions are performed exactly once at the access point to determine the network egress point. Local routing is responsible for establishing a tandem voice path to the egress point, given the terminating switch identified by network routing.

Because routing is deterministic, the network call segments can begin service processing in parallel with the establishment of tandem voice path. Service processing must synchronize at the terminating switch with the incoming voice path message before it can send the outgoing protocol message.

Incoming protocol messages, whether from the network originating or terminating agent, are processed solely by the network call segments. The incoming protocol message is handled by the associated call segments, converted to whatever communication scheme is used, and sent to the other network call segment. Intermediate tandem agents do not see those messages.

Network Call Segments—Implementation

Network call segments must use some protocol to communicate. A middleware layer between the call segments and the WAN protocol stacks enables transparent remote method invocations on distributed objects, even across a heterogenous platform mix. Both location transparency and architecture transparency are provided by the middleware. The most complete and modern middleware solution is CORBA (Common Object Request Broker Architecture) which provides all of the functionality necessary to form a communications backbone for network call segments. Location transparency allows a local call segment to invoke an operation on a remote call segment using a local method invocation paradigm. CORBA takes care of the network connections, marshalling and unmarshalling parameters as well as returning and synchronizing the invocation results. In the special case that the originating and terminating call segments are on the same switch, network connections are not necessary. CORBA can identify and handle this situation appropriately without extra effort in the application code.

Architecture transparency is provided by CORBA when the call segments are distributed and reside on switches with differing computing architectures. Hardware complexities such as byte ordering, big/little endian conversions, sizes of basic types, etc. are addressed by CORBA. As well, CORBA can bridge between call segments implemented with different high level programming languages. This is accomplished by specifying an interface to the call segments in a declarative language called IDL (Interface Definition Language). The IDL interface serves as a contract between call segments. So long as the interface specification is faithfully adhered to, call segments implemented by different vendors on proprietary platforms can communicate. This will allow interoperability on networks comprised of multiple vendor switches. Hence, the protocol definition for network call segments is simply an IDL interface if CORBA middleware is employed.

Translations

Successful translations will return a prioritized list of sets (non-prioritized) containing network destination IDs. A destination ID is a unique identifier that specifies one or more equivalent terminating points on the network. This termination point will usually lead to an off-network switch, but can lead to on-network devices such as an IP or operator platform. The destination IDs are grouped into non-prioritized equivalent sets. This enables the customer to specify multiple destinations for a single call. Network routing is responsible for selecting a least-cost route to any of those destinations. Destination sets are prioritized within the Destination List. If one set is completely unavailable, the call can overflow to the next set.

Destination List

There are three destination sets—A, B and C such that:
Set A: (Dest A1, Dest A2, Dest A3)
Set B: (Dest B1)
Set C: (Dest C1, Dest C2)
which contain within a set, from the terminating subscriber's perspective, functionally equivalent destinations. All destinations in Set A will be attempted before overflowing to Set B, and finally to Set C if necessary. The order in which the destinations within a set are attempted is not specified by translations—they are all equivalent. Network routing is responsible for finding the least cost route within a set. If no route can be found to any destination within the entire list, the call must be released. Note that often, as in the case of private phone lines, translations may produce a single set with a single destination ID.

A Destination ID is defined such that changes to the network configuration do not affect the translations database. It is a GUID (Global Unique Identifier) on the network which maps to a set of network links, where a link is defined as a switch/edge pair. An edge may be either a line or a trunk. This mapping is defined for the entire network, not locally per switch.

Network Routing

Network routing processes the destination list supplied by translations one set at a time. Processing is completed if any route is found within a set. If multiple routes are found, the best one is chosen. The algorithm used to determine the best route is an implementation issue of the network router.

The destination IDs within a destination set expand to produce every network link that fulfills that routing request. The network router generates a path and cost to each link—the algorithm mentioned above—based upon network data. This can be either a dynamic scheme based upon current traffic figures of tandem and terminal links, or a static scheme based solely upon the network configuration. Agent restrictions, such as bearer capacity, data call, and ISUP all-the-way (as examples) may be placed upon the selection algorithm. If no available route is found, the next set is processed. Otherwise, the network link with the least cost route is selected and associated with the destination ID from which it was generated. It is possible for a network link to be generated by multiple destination IDs, in which case it does not matter which one is selected. The network link and generated path are sent to local routing with the unique call id. Translations is returned the network link and associated destination ID. This allows translations to perform any processing required to enable termination to that destination, such as digit manipulations. This information is passed from translations back to the invoking call segment which must then establish communication with the terminating network call segment.

Local Routing

Local routing is responsible for establishing voice path to the next link in the path. Ultimately, local routing returns to the originating call segment the local agent to which it will be connected. If the network terminator is local to the originating switch, it returns that agent. Otherwise, it must establish voice path over a tandem agency, and return the local tandem agency.

A path to the terminating network link consists of a list of switch IDs. A tandem agent connected to the first switch in the path is seized and sent the remaining path and the unique call ID. Local routing can receive a path in two manners; from network routing as discussed above, or from an incoming tandem trunk. If the path is received from a tandem agent and is not empty, local routing also establishes a two-way PCM connection between the IMT agents. If the path is empty, the last switch has been reached and the unique call id is used to associate the tandem agent with the network terminating call segment.

If a connection cannot be made—such as due to congestion or a fiber cut after the path was generated—local routing can request network routing to generate a new path, given the loss of connectivity between switches. If network routing cannot find a path to the final switch, the call is released back one switch at a time until either a path is found or no path to the destination can be made, in which case the originating call segment must be notified. In this case the communication to the terminating call segment must be severed, and the call can re-route at the network level using the entire destination list so that another terminating network link can be selected.

Establishing Tandem Voice Path

A switch must make a two-way PCM connection between two agents for voice to flow from one circuit to another. At a network level, to achieve end-to-end voice path, every switch from access to tandem to egress must make a connection. If a PCM connection is removed at any point in the network call, end-to-end connectivity is lost. Existing switch oriented architectures turn PCM on and off at every switch, including tandem switches, as the call stage progresses, based upon received protocol messages. In network call processing, however, protocol messages are handled solely by the call segments associated with network access and egress agents. End-to-end connectivity can be controlled at these two points alone, removing the need to manipulate PCM connections at tandem switches based on the call stage. As soon as they are added to a pipe, IMT trunks enable PCM, which reduces the processing load on tandem switches.

Conceptually, network call processing creates a network level pipe between the access and egress points. This network pipe can be thought of as the set of local pipes connecting the IMT agencies to each other and the network boundary points, although the network pipe need not have detailed knowledge of the local switches involved.

The local routing processor uses the existing signaling infrastructure to connect tandem trunks to the call. The path is generated by network routing at the network originating switch and is sent over the tandem trunks. It is an ordered list of switch IDs, which when connected via IMT trunks, will produce established PCM across the network between the network access and egress points.

Establishing Tandem Voice Path—Implementation

This implementation assumes tandem trunks use the ISUP IMT protocol, which is common throughout North America. The bare bones messaging is as follows:

IAM→
←ACM
←ANM
REL (either direction)
RLC (opposite direction)
Initial Voice Path Setup The switch must be able to determine when an origination should establish voice path immediately upon receipt of the IAM. This can be flagged by the presence of the network path parameter sent by local routing. Because the IMT trunks will not receive the acknowledgment message from the network (it will be processed only by the network call segments), an ACM of local significance must be sent back upon receipt of an IAM with the path parameter. Because an ANM will never be received, timers waiting upon the ANM must be canceled.

Figure 4:
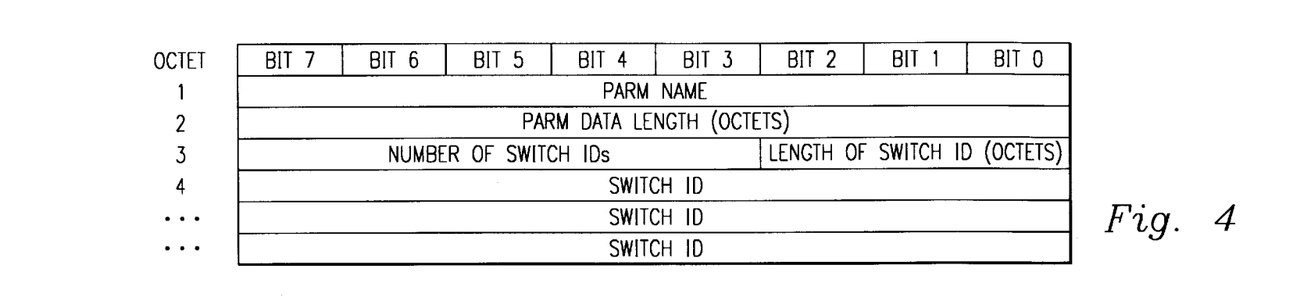
FIG. 4 illustrates a structure of a path parameter of the present invention.

FIG. 4, "Path Parameter", describes the structure of the path parameter which must be added to the ISUP IMT protocol as an optional IAM and REL parameter. Octet 1 is the parm name. Octet 2 is the length of the parm data. Octet 3 begins the parm data. Because networks may vary the length and manner of encoding the switch ID, octet 3 contains the length in octets of an encoded switch ID and the number of switch IDs included in the parm. Three bits are used for the Switch ID length and five for number of switch IDs. This limits the length of an encoded switch ID to 8 octets, and the number of tandem switch IDs that can be included in the parm to 16. These limits should be sufficient for any existing telephony network. Subsequent octets, starting at octet 4, contain the switch ID data encoded in a network proprietary manner.

Path Parameter

When an IAM containing a path parameter is accepted by a switch, it must be processed differently than a traditional IAM. If the parameter contains no switch IDs, then the call is at it's final destination, in which case the agent ID of the incoming IMT agency must be associated with the terminating call segment via the unique call ID. This is done by creating a local pipe associated with that ID and adding the IMT trunk. If the parameter contains switch IDs, then an IMT agent connected to the first switch in the path must be found and seized. Before outpulsing the IAM, the topmost switch ID is removed from the top of the path parameter. Upon receipt of the ACM (of local significance), two-way voice path is established between the originating and terminating IMT agencies.

Processing of tandem agencies is a local routing function only—intended to be fast and simple. It can be performed by non-networked call segments, or, because there is no service processing, by a less sophisticated architecture. This is an implementation decision.

Network Congestion

Because the entire path is generated at the originating switch and propagated through the network, it is possible that congestion or loss of connectivity may occur between the time the path is generated and a particular leg is established. Should this occur, an alternate route will be sought, starting at the most recent switch. This is done by informing the network router of the desired destination and the currently unreachable switch. This will produce an alternate path. If no alternate path is available, or the alternate path leads back to the previous switch, a release (REL) with cause re-route is sent back to the previous switch. If the release was sent because the alternate path leads back, the new path is included in the release message. If the release contains cause re-route, but no path parameter, the receiving switch should attempt to generate a path. If no path can be found, the call should release again with cause re-route and no path parameter. This causes a depth-first search of the network. If the call releases back to the originating switch and no path can be found to that terminating link, then the originating call half must be notified that tandem voice path to the network egress point is unavailable, whereupon the call can be retranslated or completely taken down.

Call Take Down

Once tandem voice path is established between the network access and egress points, the IMT trunks do not need further processing because voice path is established immediately. However, they do need to be released when no longer needed. A release message is bi-directional, meaning it can be sent from either the originator or terminator. Some services, such as reorigination, require that the call segment be retained after the voice path is released, while others, such as Suspend/Resume, require that the voice path be retained even after receipt of a release. In all cases, if a call segment is destroyed, the associated voice path must be released. This is done in the existing manner by sending a release with cause normal clearing across the link. A call segment which is removing itself from a call must perform the following duties:

Notify all connected call segments.

Release it's connected agents—in a complex call there may be more than one.

Tandem Failure During Talking State

Currently, if voice path is lost across an IMT link, all calls in the talking state across the broken link are released immediately. Using distributed call segments, this failure scenario can potentially be handled more gracefully. A tandem release will be sent in both directions from the failed link. Upon receipt of the release, the call segments have the option of either re-establishing voice path or tearing the call down. For voice calls, the network access and egress agencies could be connected to an announcement while the new tandem voice path is established. For data calls, this makes little sense as there will be data loss.

As an advanced service on data calls to provide (almost) guaranteed connectivity, the call could establish two tandem voice paths along physically separate mediums—a master and a standby. If the master is lost, the standby connection can become the master and a new standby will be allocated—still across physically separate mediums to avoid a single point of failure. There could be no data loss during the cutover if the communication is buffered. This is presented as a hypothetical service to display the flexibility of separating network voice path from call processing. There are unaddressed issues with this service.

Voice Path Control at the Network Boundaries

The network pipe, like a local pipe, can turn the PCM flow on and off in either direction at both ends of the pipe. Controlling PCM at these two points switches the end-to-end voice path across the entire network. This is a direct consequence of enabling PCM on all IMT trunks when added to a pipe.

Voice Path Control—Implementation

The implementation is dependent upon the connection model employed by the local switches. Any switch call processing architecture (IN, AIN, TINA-C, etc.) contains an entity which models the connections between voice agents. The concept of controlling voice path at the network boundary can be implemented regardless of how it is modelled.

The call setup responsibilities of the originating and terminating network call segments are as follows. Responsibilities of the originator are preceded by 'O', those by the terminator with a 'T'. 'N' and 'L' indicate the network and local respectively.

The originating call segment is responsible for recognizing the origination and creating the pipe and is implemented in the following subroutine calls.

NO: Create (pipe)

Once the pipe is created, the originating call segment must add himself to that pipe.

NO: pipe.Accept_Agent (associated agent)

At this point translations are invoked. Local routing will identify a local terminator and insert him into the pipe if an IMT agent is necessary.

LT (IMT): pipe.Accept_Agent (local terminator)

If the local terminator is an IMT trunk, PCM will be enabled immediately. If the local terminator is the actual network terminator (single switch case) then the terminating network call segment will not enable PCM.

LT (IMT): pipe.PCM_On (local terminator, both directions)

The network terminator accepts the termination attempt from the network originator and adds himself to the pipe associated with the unique call ID. In the local case this will be the pipe created in step (1), if an IMT agent is involved, it would have created the pipe.

NT: pipe.Accept_Agent (network terminator)

At this point both agencies are connected via to a pipe. It may be the same pipe in the local case or two different pipes on separate switches. Regardless, PCM is not enabled at the network boundary points, so end-to-end connectivity does not exist. When ringing is signaled by the terminating call half, PCM will be turned on in the backwards direction. This will enable the ringing to be transmitted from the network terminator to the network originator.

NT: pipe.PCM_On (network terminator, backwards)

NO: pipe.PCM_On (network originator, backwards)

Finally, PCM will be turned on in the forward direction when answer is signaled by the terminating call half. At this point end-to-end connectivity has been established.

NT: pipe.PCM_On (network terminator, forward)

NT: pipe.PCM_On (network originator, forward)

Communication Mechanism

Although CORBA is probably the best middleware solution for network call segments, any middleware product is a viable alternative, such as DCE, Java RMI, DCOM or a proprietary solution to name a few. A traditional data network, such as X.25, could replace middleware if desired.

Establishing Tandem Voice Path

Figure 5:
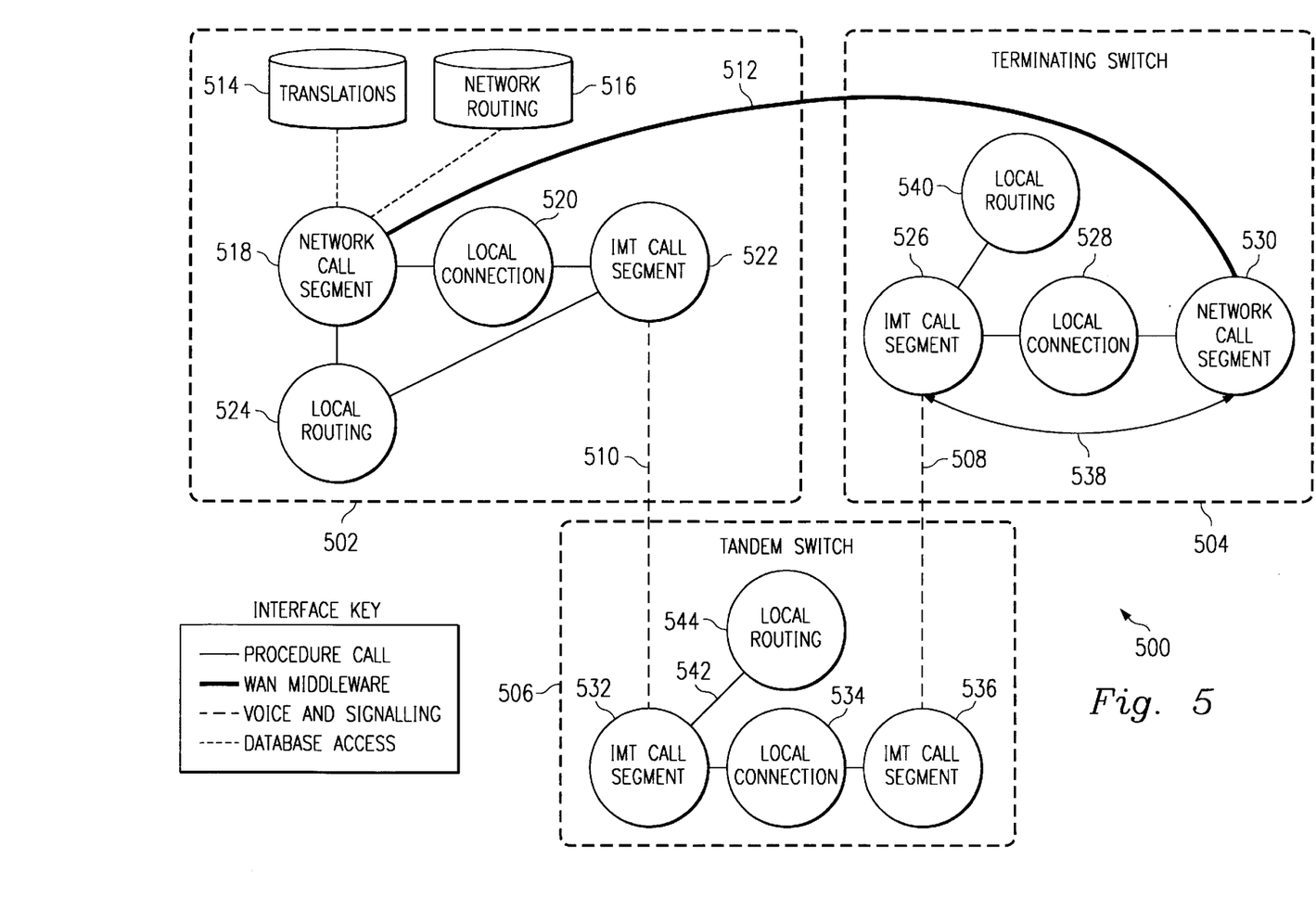
FIG. 5 illustrates a functional block diagram of the system components of the present invention.

A new entity, called the Network Call Topology Processor (NCTP), in FIG. 5 is responsible for managing each switch's connections. The path generated by the local router is processed by the NCTP which determines the individual IMT agents which best utilize network resources, and directs the switches to seize and connect these agents. This requires network level knowledge of configuration information, current traffic and bandwidth. The originating call half must request voice connectivity between the originating and terminating switches from the NCTP, which directs the selected intermediate switches to allocate the voice path.

Protocol for Establishing Tandem Voice Path

There are many ways in which the ISUP IMT protocol can be altered to accommodate establishing immediate tandem voice path. It could be done based upon agent type, with different parameters or even by adding a proprietary message. In addition, any protocol can be used, such as ISDN PRI (used for tandem trunks in Europe to some degree) or even some form of PTS signalling such as R2.

Local Routing

An alternative to propagating the initially generated path across the IMT agencies is to pass only the final destination network link. Local routing will then have to regenerate the best path to the final destination. Because of the rapidly changing traffic situations in a network, this may be a preferred mechanism when using a dynamic network routing scheme, although this does make tandem routing more complicated and expensive.

Voice Path Control at the Network Boundaries

The responsibilities of the network boundary agencies can be altered. Instead of allowing both boundary agents initial voice path control, that responsibility can be moved solely to one agent. The other agent would still have control capabilities, but upon call setup would enable the PCM flow.

Network Call Segments Across Network Boundaries

The discussion so far has assumed that the network call segments lie within the same network. With the advent of telephony deregulation in the United States and international joint ventures, a single operating company may administer many networks. It is feasible for an originating call segment in one network to talk to a terminating call segment in another network. As long as the call remains within a network administered by the same service provider, it need only be processed once. If the interface between call segments is standardized, as well as the mechanism for establishing tandem voice path, call segments within networks administered by different operating companies can communicate. Ultimately, a call needs to be processed only once— between the true originating and terminating switches.

With respect to FIG. 5, network 500 can now be described further. Originating switch 502 includes translations 514, network routing module 516, network call segment 518, local connection 520, intermediary trunk call segment 522, and local routing 524. Terminating switch 504 is connected by WAN middlewear 512 with originating switch 502. Network call segment NCS 518 or the originating switch is connected through the WAN to network call segment 530 of the terminating switch. Tandem switch 506 is by-passed by the WAN is this example.

Terminating switch 504 has intermediary trunk call segment ICS 526 connected to local routing LR 540. ICS 526 is also connected directly to local caller routing 528 and to network call segment 530. The actual voice path still travels through tandem switch 506 which includes intermediary call segment 532, local routing segment 544, intermediary call segment 536, and local connection 534. Tandem switch 506 is also connected to intermediary call segment 522 of the originating switch by way of intermediary call segment 532, the tandem switch and intermediary call segment 526 of the terminating switch through intermediary call segment 536 of the tandem switch.

Figure 6:
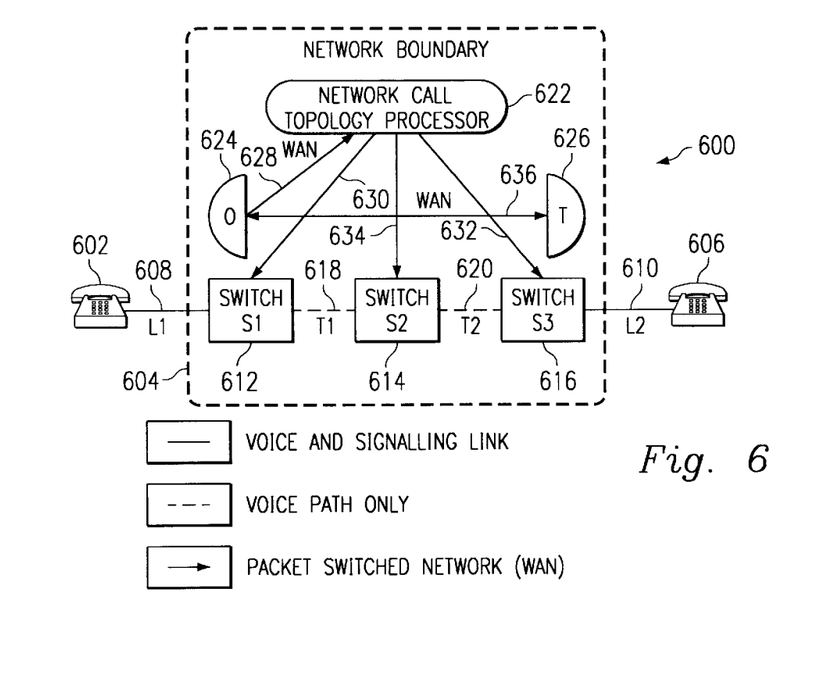
FIG. 6 illustrates a configuration of the network call topology processor of the present invention.

FIG. 6 illustrates an alternative embodiment of the present invention. Network 600 is substantially similar conceptually to the network of FIG. 3. However, the network call topology processor 622 is connected to both the originating segment 624 and in a star configuration to switches 612, 614, 616 via link 632, 634, and 630.

Many benefits may be realized from the instant invention. The invention results in reduced processing load on switches. Tandem processing is reduced. Tandem switches only process two messages during the life of the call as compared to a minimum of four in current systems. The processing includes a simple routing function, and need not include service processing which is more expensive. Only agents with access to egress to the network require service processing. Another advantage is a results in better utilization of network resources. Calls that re-route are bridged or redirected often consume more network bandwidth than is necessary. A call may route to one end of the network and from there be re-directed back to its originating point tying up unneeded voice connections in between. Using network call segments, tandem voice path can be released and then optimally reallocated every time the originator reconnects to another terminator.

The instant invention additionally simplifies implementing services. From a call processing perspective every call appears to be terminating directly off network from the same switch cause the network originating and terminating calls segments talk directly. This eliminates the need to include service information in intermediary trunk protocol.

Other such embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An apparatus for using distributed call segments to restore a connection between an origination and a destination across a failed link comprising:

means for issuing a tandem release from said failed link, means for establishing a new tandem connection across a predetermined alternate path between said origination and said destination; and means for allocating a new alternate path between said origination and said destination.

2. An apparatus as in claim 1 wherein said connection is a voice connection.

3. An apparatus as in claim 1 wherein said connection is a data connection.

4. An apparatus as in claim 1 wherein said failed link comprises a first connection path, the apparatus further including means for establishing said first connection path along a first connection medium.

5. An apparatus as in claim 4 wherein said new tandem connection comprises a second connection path, the apparatus further including means for establishing said second connection path along a second connection medium, wherein said second connection path is remote from said first connection path.

6. An apparatus as in claim 5 further including means for utilizing said second connection path in the event said first connection path is degraded.

7. An apparatus as in claim 6 further including means for optionally transmitting to one of said origination and destination a predetermined message if said second connection path is utilized.

8. An apparatus as in claim 7 further including means for transmitting said predetermined message if a predetermined re-connection time across said second connection path is exceeded.

9. A method for using distributed call segments to restore a connection between an origination and a destination across a failed link comprising the steps of:

issuing a tandem release from said failed link, establishing a new tandem connection across predetermined alternate path between said origination and said destination and allocating a new alternate path between said origination and said destination.

10. A method as in claim 9 wherein said connection is a voice connection.

11. A method as in claim 9 wherein said connection is a data connection.

12. A method as in claim 11 wherein said failed link comprises a first connection path, the method further including the step of establishing said first connection path along a first connection medium.

13. A method as in claim 12 wherein said new tandem connection comprises a second connection path, the method further including means the step of establishing said second connection path along a second connection medium, wherein said second connection path is remote from said first connection path.

14. A method as in claim 13 further including the step of utilizing said second connection path in the event said first connection path is degraded.

15. A method as in claim 14 further including the step of optionally transmitting to one of said origination and destination a predetermined message if said second connection path is utilized.

16. A method as in claim 15 further including the step of transmitting said predetermined message if a predetermined re-connection time across said second connection path is exceeded.

* * * * *